Sept. 9, 1958　　　C. W. BONDURANT　　　2,850,794
METHOD OF FORMING GEARS
Filed March 14, 1955
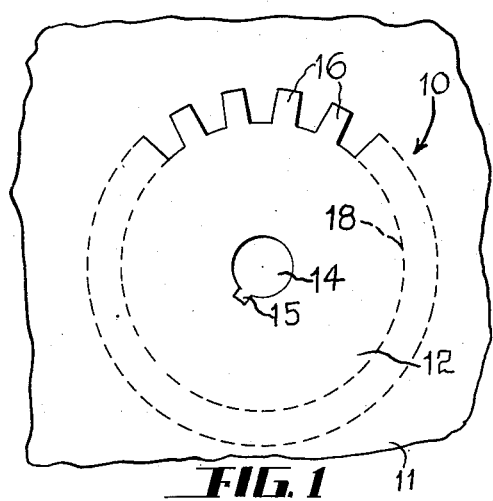
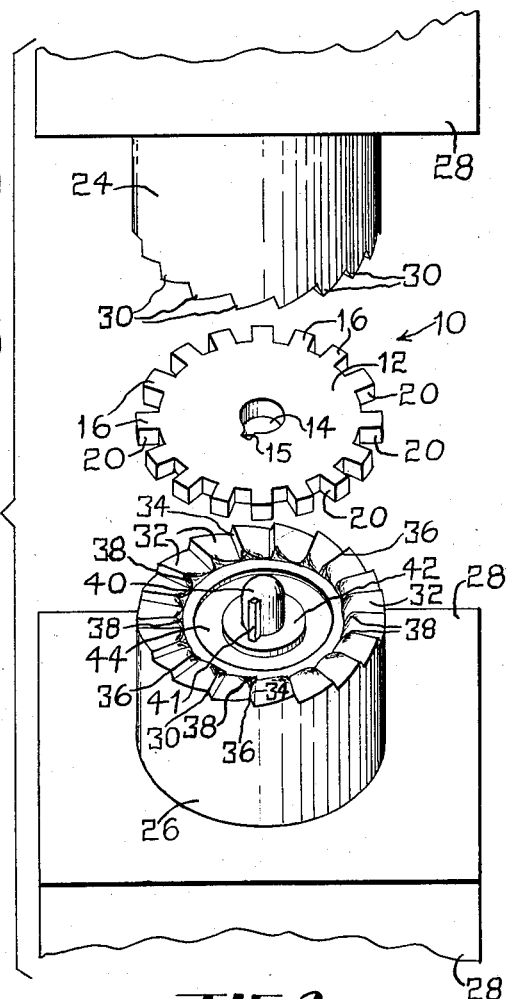
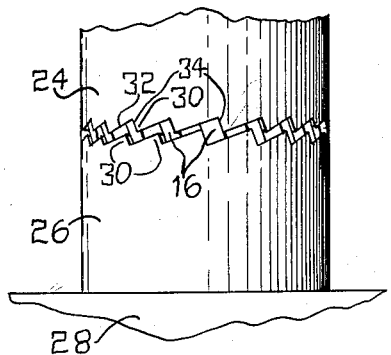
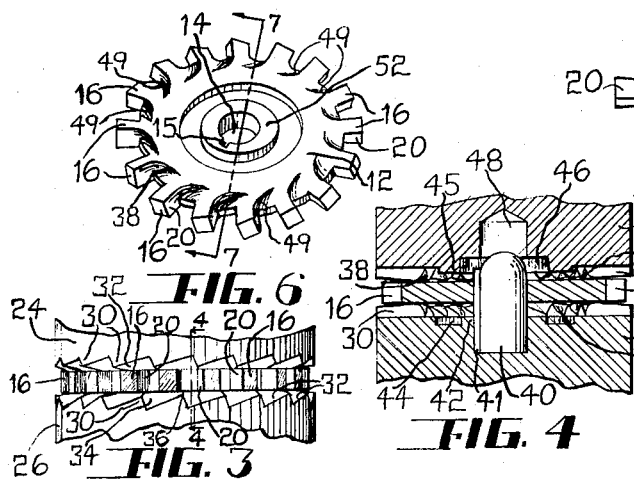
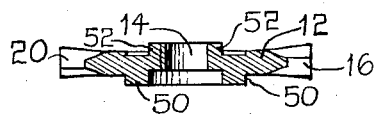
INVENTOR.
CARLTON W. BONDURANT
BY
HIS ATTORNEYS United States Patent Office 2,850,794
Patented Sept. 9, 1958

2,850,794

METHOD OF FORMING GEARS

Carlton W. Bondurant, Dayton, Ohio, assignor to Standard-Thomson Corporation, Vandalia, Ohio, a corporation of Delaware Application March 14, 1955, Serial No. 493,917

3 Claims. (Cl. 29—159.2)

This invention relates to a method of forming gears. The invention relates more particularly to a method of forming worm gears. The invention relates still more particularly to a method of producing worm gears from a sheet of material. However, the invention is not so limited in that it may be used in providing worm gears from other forms of material. The invention may also be used for other types of gears and for other purposes.

In the past, it has been necessary to employ a cutting means in order to form angular gear teeth such as the teeth of helical gears. Naturally, it is understood that a cutting process, such as done by a milling machine or other gear cutting apparatus, is rather time-consuming and expensive.

An object of the invention is to provide a method for producing worm gears at low cost.

Another object of this invention is to provide a method for producing worm gears from a sheet of material.

Other objects and advantages reside in the construction of parts, the combination thereof and the mode of operation, as will become more apparent from the following description.

In the drawing:

Figure 1 is a top plan view of a sheet of material and a gear stamped therefrom according to the method of this invention.

Figure 2 is an exploded view showing forming die members and a stamped gear in position for engagement of the die members with the gear for angularly forming the teeth of the gear.

Figure 3 is a fragmentary side elevational view showing the forming dies and a gear contacted thereby disclosing the manner in which the gear is initially engaged by the forming die members.

Figure 4 is a sectional view taken substantially on line 4—4 of Figure 3.

Figure 5 is a fragmentary side elevational view showing the forming dies and a gear disposed therebetween in the final step of angularly forming gear teeth according to this invention.

Figure 6 is a perspective view showing a gear after the teeth thereof have been angularly rotated with respect to the other portions of the gear according to the method of this invention.

Figure 7 is a sectional view taken substantially on line 7—7 of Figure 6.

Referring to the drawing in detail, a circular disc 10, such as shown in Figures 1 and 2, may be formed from a sheet of material 11 by any suitable means, such as by stamping, punching, cutting and the like. The material of the sheet 11 may be of any suitable metal or other substance, which material or substance is somewhat ductile having the ability to flow or move, rather than fracture, when pressure is applied thereto. The circular disc 10 has a hub 12 provided with a centrally located aperture 14. The aperture 14 has a key slot 15. The disc 10 also has a plurality of radially extending teeth 16. The teeth 16 have a root line 18, shown by broken lines in Figure 1.

The teeth 16 are shown herein as being substantially rectangular in shape; however, the teeth may be formed in other suitable desired shapes. Flanks 20 of the teeth 16 are parallel to the axis of rotation of the disc 10. The flanks 20 of the teeth 16 are therefore perpendicular to the side surfaces of the hub 12.

In order that the disc 10 may be formed into a worm gear, the teeth of which are adapted to be engaged by the helix of a worm, the flanks 20 of the teeth 16 must be at an oblique angle with respect to the surfaces of the hub 12.

In this invention, it has been found that if sufficient pressure is applied to a plurality of areas of each side surface of the disc 10, to cause movement of the material at these areas, a turning of the teeth results without deforming the teeth.

A means is disclosed herein for simultaneously applying pressure to the proper areas of the disc 10 for forming the teeth 16 angularly without twisting of the body of the teeth 16. Complementary forming dies 24 and 26 are held by retainer members 28 which are reciprocally movable, one with respect to the other. The forming dies 24 and 26 are shown as cylindrical in shape, the ends of which are provided with a plurality of irregularly shaped protuberances 30. Each of the protuberances 30 has an inclined surface 32 and a shoulder portion 34 joined by a vertex 36. Each vertex 36 extends radially inwardly and terminates in a curved area 38. As clearly shown in Figures 2, 3 and 5, each inclined surface 32 slopes toward the next adjacent shoulder portion 34.

Centrally located at the end of the forming die 26 and extending therefrom is a pin member 40 provided with an elongate key 41. Encompassing the pin 40 and concentric therewith is a disc portion 42 which may be integral with the die member 26. The disc 42 is disposed within an annular recess 44.

Centrally located among the protuberances 30 of the die member 24 at the end thereof is an annular rib 45 encompassing a cylindrical recess 46. The recess 46 is complementary to the disc portion 42 of the die 26 and the rib 45 is complementary to the annular recess 44. Centrally located within the recess 46 of the die 24 is a cylindrical cavity 48, which is adapted to receive the pin 40 of the die 26, as clearly shown in Figure 4.

In the forming of the teeth 16 of the disc 10 at an angle with respect to the surface of the hub 12, the disc 10, as shown in Figure 2, is positioned upon the die 26 with the pin 40 of the die 26 disposed within the aperture 14 of the disc 10. The key slot 15 slidably engaging the key 41 positions the disc 10 upon the die member 26 so that the curved area 38 of each of the protuberances 30 engages the hub 12 of the disc 10 adjacent the root line 18 of the teeth 16. The vertex 36 of each protuberance 30 is positioned adjacent one of the flanks 20 of each tooth 16.

Then the die member 24 is moved into engagement with the opposite surface of the disc 10 so that the curved areas 38 of each of the protuberances 30 of the die 24 engage the hub 12 adjacent the root line 18 of the teeth 16 and adjacent the opposite flank of each tooth 16, as shown in Figures 3 and 4. Then pressure is applied by movement of the die members 24 and 26 one toward the other, as shown in Figure 5. The curved areas 38 of the protuberances 30 move the material of the hub 12 toward the teeth 16 at the flanks 20 thereof. The material of the disc 10 at the root line 18 at opposite flanks 20 of each tooth 16 is thus swaged; a plurality of slight arcuate depressions or deformations 49 are thus caused at opposite surfaces of the disc 10 adjacent the root line 18 of the teeth 16, as shown in Figure 6.

This swaging action at opposite surfaces of the hub 12 and at opposite flanks of the teeth 16 results in a twisting of the metal of the hub 12 adjacent the root line of each of the teeth 16. This turning or twisting of the metal at the root line of the teeth causes rotation of the teeth 16 without causing a twisting of material within the body portions of the teeth 16. The teeth 16 are not deformed by the deformation of the hub 12, but the deformation of the hub 12 at the root line of the teeth 16 results in rotational movement of the teeth 16 with respect to the hub 12.

The inclined surfaces 32 of the protuberances 30 provide engagement surfaces for the teeth 16 and serve as auxiliary means for properly setting the oblique angle of each of the teeth 16, so that the angle to which each tooth is disposed is substantially the same.

The disc 42 cooperating with the cylindrical recess 46, and the annular recess 44 cooperating with the annular rib 45 may be employed to form annular axial projecting portions 50 and 52 upon the disc 10 so that the gear wheel produced therefrom by means of this invention may be more readily mounted in certain types of gear housings.

Thus, a gear wheel, such as shown in Figure 6, may be produced. The gear wheel of Figure 6 is adapted to be operated by a helical worm in a worm and worm gear combination.

It is understood that the method of this invention makes possible the production of worm gears from a sheet of material, the worm gears being produced at comparatively very low cost and with a minimum number of operations.

The method of this invention may also be employed to produce gear segments or sections.

It is understood that the method of this invention may be carried out by applying sufficient pressure upon proper areas adjacent the teeth and at opposite side surfaces of the gear. The conventional cutting operation or casting operation is not required.

It is to be understood from the foregoing description that the method of this invention may also be employed in the production of types of gears other than worm gears.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of forming a gear wheel from an arcuate section of sheet metal having a hub with a plurality of radial teeth at the periphery thereof comprising applying forging pressure only to the hub at areas adjacent each of the teeth at the root line thereof the forging pressure being adjacent one flank of each tooth on one side of the hub and adjacent the opposite flank of the tooth on the opposite side of the hub, such opposed forging pressure on the hub at opposite flanks of the teeth being sufficient to cause movement of the engaged areas of the hub adjacent the root line of the tooth, thus causing angular movement of the tooth with respect to the sides of the arcuate section of sheet metal.

2. The method of producing a gear wheel from a disc having a rotatable hub and radial teeth which extend parallel to the axis of rotation thereof, applying forging pressure to the hub adjacent the root line of each tooth upon opposite sides of the gear wheel and adjacent opposite flanks of the teeth, the forging pressure being applied only to the hub and in a direction substantially parallel to the axis of rotation of the gear wheel, the forging pressure being sufficient to cause movement of the engaged portions of the hub, thus causing angular displacement of the teeth with respect to the axis of rotation of the gear wheel without changing the shape of the teeth.

3. The method of forming a worm gear from a disc having a hub and a plurality of teeth extending radially therefrom, the periphery of the hub forming a root line of the teeth, comprising application of forging pressure upon the hub upon opposite surfaces thereof, forging pressure being applied only to an area of the hub adjacent each tooth and adjacent the root line thereof, the forging pressure being applied on one side of the hub adjacent one flank of each tooth and on the other side of the hub adjacent the opposite flank of the tooth, said forging pressure being sufficient to displace the material engaged, thus causing angular movement of the teeth with respect to the other portions of the disc.

References Cited in the file of this patent

UNITED STATES PATENTS

| | | |
|---|---|---|
| 1,915,612 | Olson | Mar. 23, 1931 |
| 2,194,595 | Hart | Nov. 16, 1936 |
| 2,206,831 | Berthelsen | July 2, 1940 |
| 2,295,583 | Jordon | Sept. 15, 1942 |